US012725048B2

(12) United States Patent
Lee et al.

(10) Patent No.: US 12,725,048 B2

(45) Date of Patent: Sep. 1, 2026

(54) EFFICIENT SCALING OF PARTITIONED NEURAL NETWORK INFERENCE

(71) Applicant: Cisco Technology, Inc., San Jose, CA (US)

(72) Inventors: Myungjin Lee, Bellevue, WA (US); Jayanth Srinivasa, San Jose, CA (US); Ali Payani, Santa Clara, CA (US); Ramana Rao V. R. Kompella, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 516 days.

(21) Appl. No.: 18/368,801

(22) Filed: Sep. 15, 2023

(65) Prior Publication Data

US 2025/0094823 A1 Mar. 20, 2025

(51) Int. Cl.
*G06N 3/098* (2023.01)

(52) U.S. Cl.
CPC .................................... *G06N 3/098* (2023.01)

(58) Field of Classification Search
CPC ...................................................... G06N 3/098
See application file for complete search history.

(56) References Cited

U.S. PATENT DOCUMENTS

| | | | |
|---|---|---|---|
| 2019/0065954 A1 | 2/2019 | Bittner, Jr. et al. |
| 2020/0372337 A1 | 11/2020 | Ebrahimi et al. |
| 2021/0390405 A1 | 12/2021 | Choi et al. |
| 2022/0391209 A1 | 12/2022 | Fowers et al. |
| 2023/0144662 A1 | 5/2023 | Tasinga et al. |

OTHER PUBLICATIONS

Dean, The Tail at Scale (Year: 2013).*
Li, AlpaServe: Statistical Multiplexing with Model Parallelism for Deep Learning Serving (Year: 2023).*
Chen, et al., "Partition and Reunion: A Two-Branch Neural Network for Vehicle Re-identification", CVPR Workshops, Jun. 2019, pp. 184-192, IEEE Explore.
Gao, et al., "TETRIS; Scalable and Efficient Neural Network Acceleration with 3D Memory", ASPLOS'17, Apr. 8-12, 2017, pp. 751-764. Xi'an, China.

* cited by examiner

*Primary Examiner* — Aryan E Weisenfeld
(74) *Attorney, Agent, or Firm* — Lee & Hayes, P.C.

(57) ABSTRACT

In one implementation, a controller determines performance of a partitioned neural network. The controller identifies, based on the performance, a particular partition of the partitioned neural network as a bottleneck. The controller configures a first device to execute a replica of the particular partition. The controller configures a multiplexer that provides an output of the particular partition or the replica of the particular partition as input to a downstream partition of the partitioned neural network.

20 Claims, 8 Drawing Sheets

EFFICIENT SCALING OF PARTITIONED NEURAL NETWORK INFERENCE

TECHNICAL FIELD

The present disclosure relates generally to computer networks, and, more particularly, to the efficient scaling of partitioned neural network inference.

BACKGROUND

As machine learning/artificial intelligence techniques continue to evolve and mature, the number of use cases for these techniques also continue to increase. For instance, video analytics techniques are becoming increasingly ubiquitous as a complement to new and existing surveillance systems. In such deployments, a neural network-based person detection and reidentification now allows for a specific person to be tracked across different video feeds throughout a location. More advanced video analytics techniques also attempt to detect certain types. Other use cases also range from sensor analytics, to (semi-)autonomous vehicles, to network security, to name a few.

While machine learning/artificial intelligence techniques such as neural networks are quite promising, the more capable the neural network model, the more resource intensive the model is to execute. In cases in which the model is too large to execute on a singular device, the model could be partitioned into smaller pieces (e.g., by dividing its layers) for execution in a distributed manner. However, one observation herein is that different partitions of a partitioned neural network typically consume different amounts of computational resources. This can lead to the formation of computational bottlenecks across the partitioned neural network, increasing the amount of time needed for the full neural network to complete its inference tasks.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1:
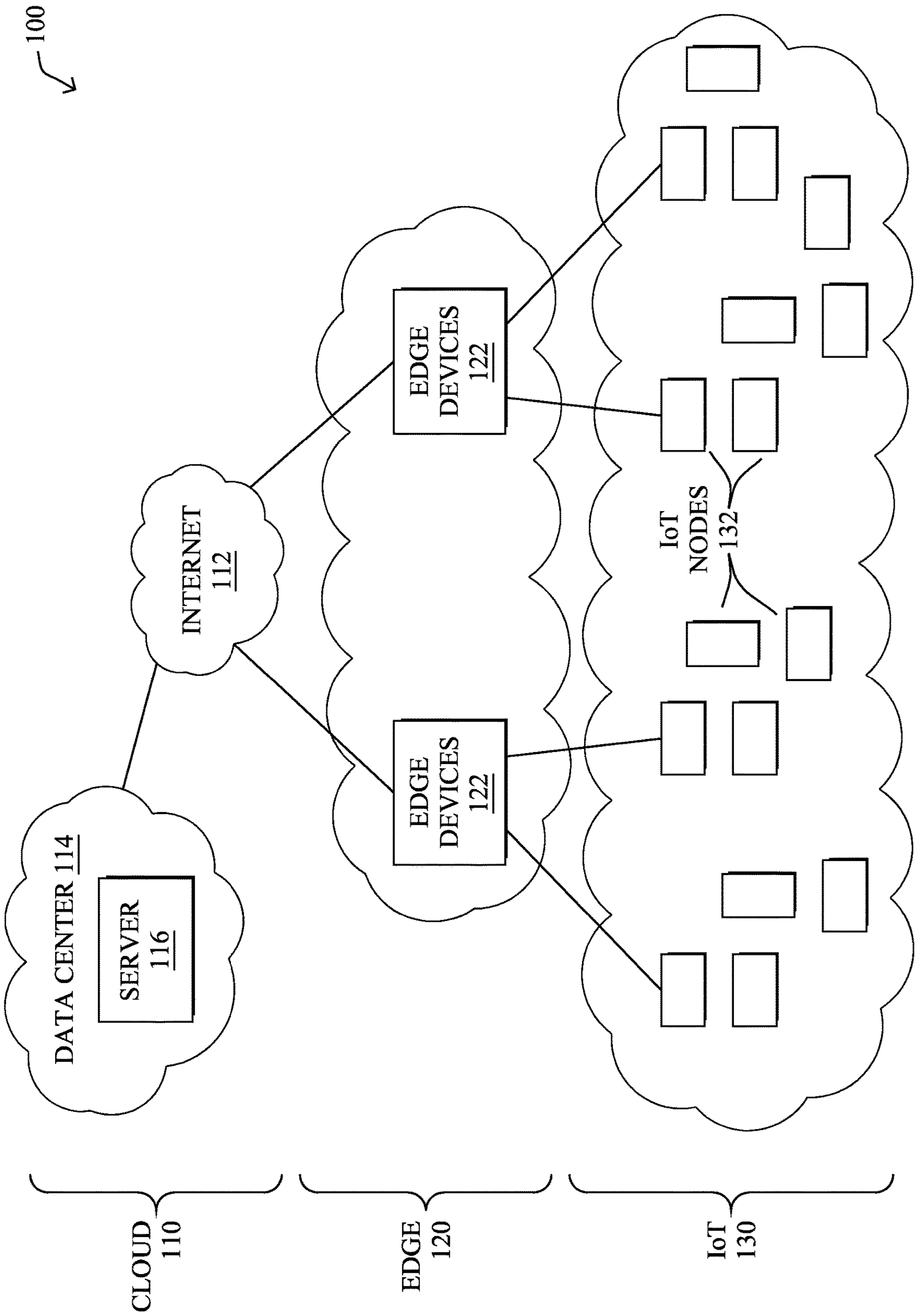
FIG. 1 illustrate an example network.

According to one or more implementations, a controller determines performance of a partitioned neural network. The controller identifies, based on the performance, a particular partition of the partitioned neural network as a bottleneck. The controller configures a first device to execute a replica of the particular partition. The controller configures a multiplexer that provides an output of the particular partition or the replica of the particular partition as input to a downstream partition of the partitioned neural network.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various implementations, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
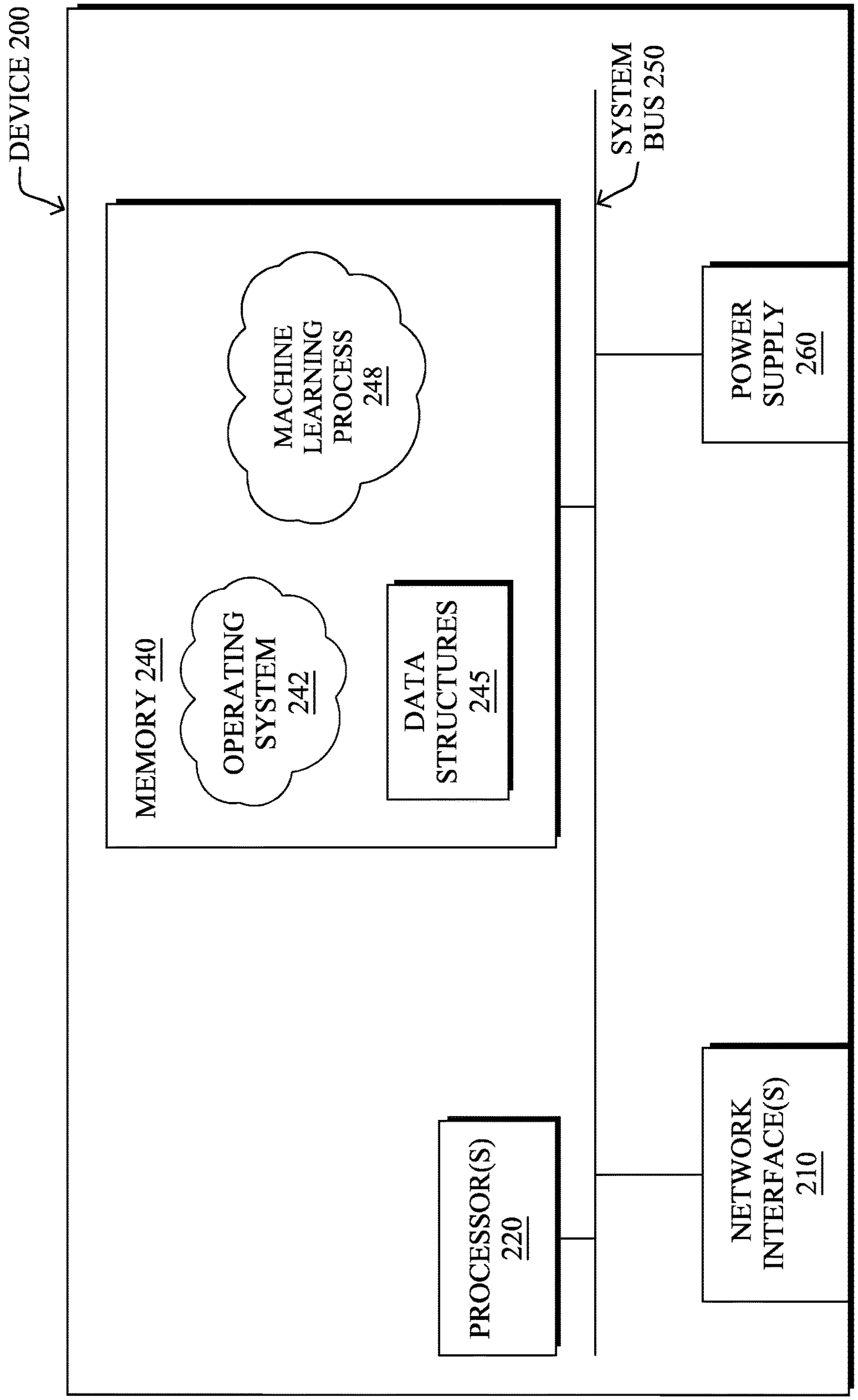
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative machine learning process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various implementations, machine learning process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that machine learning process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

In further implementations, machine learning process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that assesses video data to identify a certain type of object or event. In such a case, the false positives of the model may refer to the number of times the model incorrectly flagged the video data as depicting the type of object or event. Conversely, the false negatives of the model may refer to the number of times the model incorrectly determined that the video data does not depict the type of object or event. True negatives and positives may refer to the number of times the model correctly identified the video as not depicting the object/event or depicting it, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
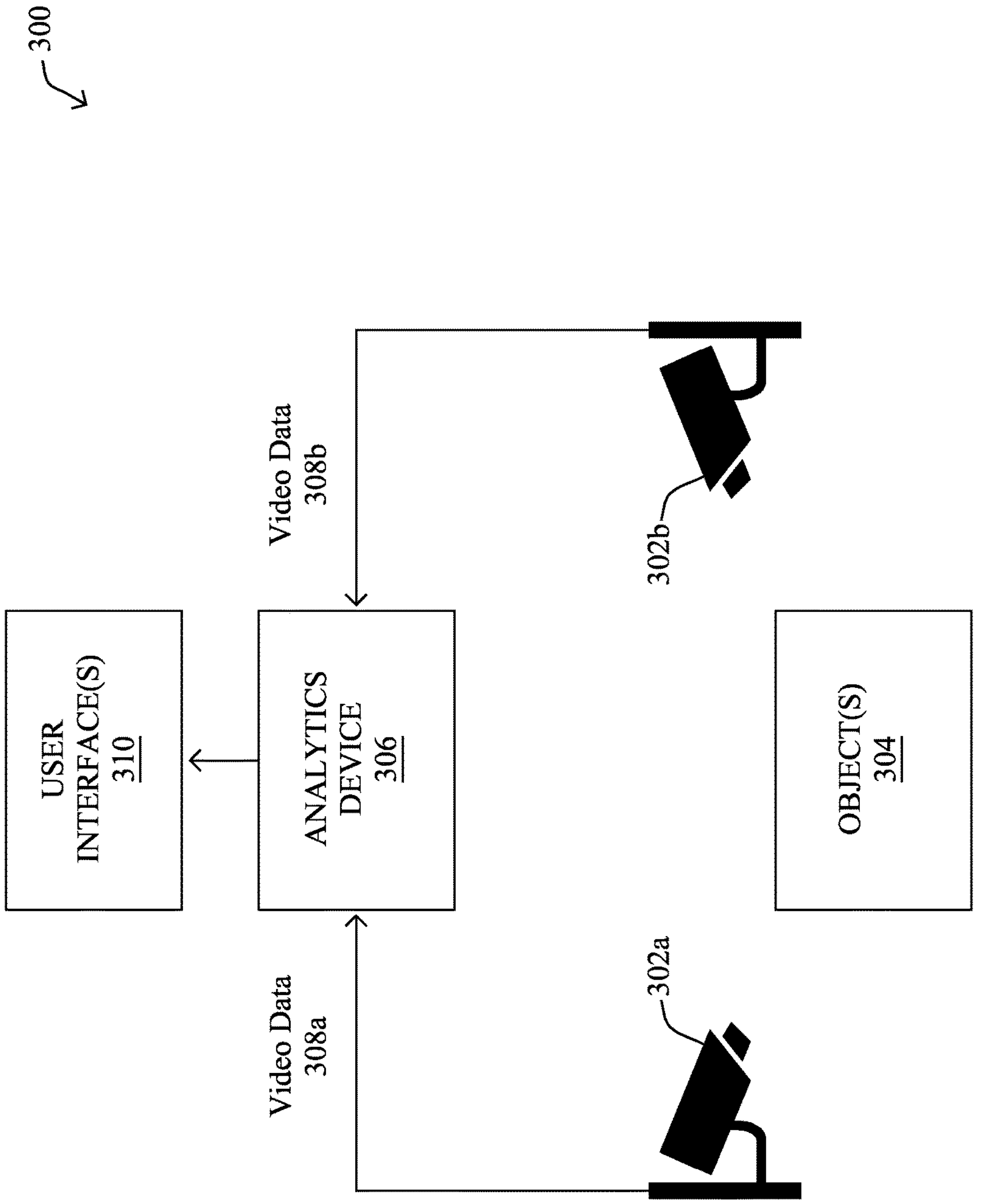
FIG. 3 illustrates an example system for performing video analytics.

FIG. 3 illustrates an example system 300 for performing video analytics, as described in greater detail above. As shown, there may be any number of cameras 302 deployed to a physical area, such as cameras **302*a*-302*b***. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras **302*a*-302*b* may generate and send video data 308*a*-308*b*, respectively, to an analytics device 306 (e.g., a device 200 executing machine learning process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302**, or the lie.

In general, analytics device 306 may be configured to provide video data **308*a*-308*b* for display to one or more user interfaces 310, as well as to analyze the video data for events that may be of interest to a potential user. To this end, analytics device 306 may perform object detection on video data 308*a*-308*b*, to detect and track any number of objects 304 present in the physical area and depicted in the video data 308*a*-308*b*. In some implementations, analytics device 306 may also perform object re-identification on video data 308*a*-308*b*, allowing it to recognize an object 304 in video data 308*a* as being the same object in video data 308*b*** or vice-versa.

As noted above, artificial intelligence/machine learning presents a wide variety of use cases, ranging from video analytics, to (semi-)autonomous vehicles, to network security, and beyond. One challenge, though, relates to the computational resources needed to execute large models. This is particularly true with respect to using a machine learning model to make inferences at a device with limited resources, such as an edge device (e.g., an edge device 122).

One way to help address the resource requirements of a neural network-based model would be to partition the neural network such that each partition includes one or more layers of the neural network and the partitions are executed in a distributed manner across a plurality of devices in a computer network. In such a setup, the first device in the chain inputs the input data to the first partition of the neural network and sends the resulting output data on to the next, downstream device and partition in the chain. This process repeats until the final device and partition is reached, in which case the output is the desired inference about the input data (e.g., a classification of the input data, etc.).

However, one observation herein is that different partitions of a partitioned neural network typically consume different amounts of computational resources. This can lead to the formation of computational bottlenecks across the partitioned neural network, increasing the amount of time needed for the full neural network to complete its inference tasks.

Figure 4A:
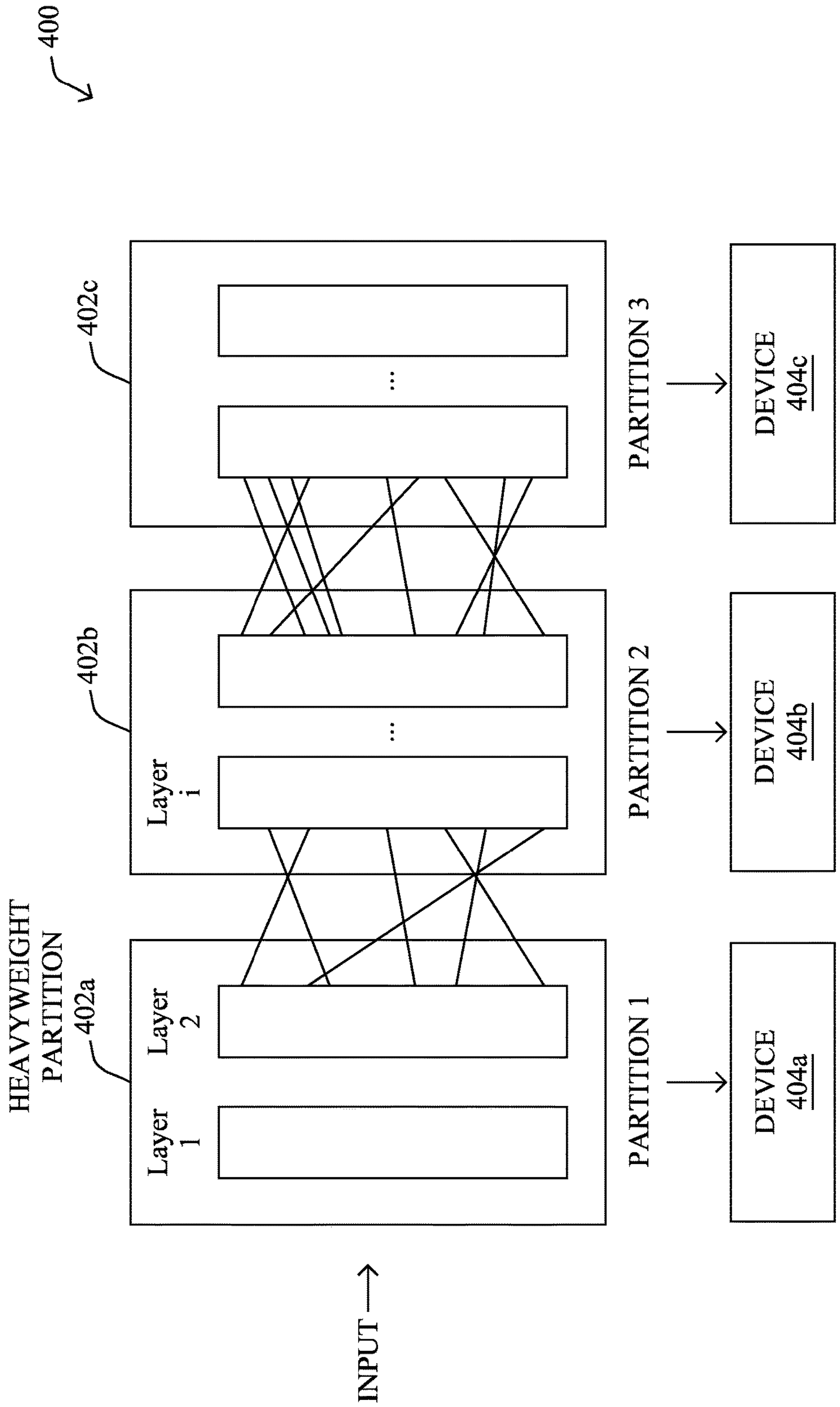
FIGS. 4A-4B illustrate an example of scaling a partitioned neural network.

By way of example, FIG. 4A illustrates an example of a partitioned neural network 400. In order to better handle the resource requirements of partitioned neural network 400, the system may divide partitioned neural network 400 into a series of partitions, such as partitions 402*a*-402*c* shown. Here, partition 402*a* may include the first layer of partitioned neural network 400 (i.e., Layer 1) and may also include any number of subsequent/downstream layers, as well, such as Layer 2 etc. Similarly, partition 402*b* may include any number of downstream layers from that of partition 402*a*. Finally, partition 402*c* may include any number of layers of partitioned neural network 400 that are downstream from that of partition 402*b*. As would be appreciated, only three partitions are shown in FIG. 4A for purposes of simplicity and a neural network may be partitioned into any number of partitions, as desired.

To help address the resource costs associated with executing partitioned neural network 400, each of partitions 402*a*-402*c* may be deployed to a different device amongst a plurality of devices 404. For instance, device 404*a* may execute partition 402*a* and provide its output to device 404*b* via a computer network for input to partition 402*b*. In turn, device 404*b* may provide the output of partition 402*b* via the computer network to device 404*c* for input to partition 402*c*.

An observation herein is that the resources required to execute each of partitions 402*a*-402*c* may vary. For instance, as shown, partition 402*a* may be considered to be a 'heavyweight' partition, requiring more computational resources than that of partitions 402*b*-402*c*. Consequently, during execution of partitioned neural network 400, partition 402*a* could present a computational bottleneck, as any delays in completing its execution by device 404*a* will lead to greater delay in partitioned neural network 400 reaching its final inference.

In some instances, one approach to address any performance degradations of partitioned neural network 400 due to partition 402*a* acting as a bottleneck would be to replicate partitioned neural network 400, allowing multiple copies of partitioned neural network 400 to be executed in parallel. For instance, as shown in example 410 in FIG. 4B, partitions 402*a*-402*c* could be replicated and deployed to a new set of devices 404*d*-404*f* for execution, respectively. Thus, one copy of partitioned neural network 400 may be executed across devices 404*a*-404*c*, while a second copy of partitioned neural network 400 may be executed across devices 404*d*-404*f*.

While the above approach could help to improve the performance of the system, it should be noted that partition 402*a* is the true bottleneck for partitioned neural network 400 and that replicating partitions 402*b*-402*c* may itself be a waste of computational resources. Indeed, taking this approach effectively doubles the computational resources needed each time that partitioned neural network 400 is replicated.

Efficient Scaling of Partitioned Neural Network Inference

The techniques herein introduce a mechanism to partition an neural network model across multiple devices in a computationally-efficient manner by replicating only those partitions that are degrading performance. By doing so, the system can elastically scale the neural network up or down as needed, somewhat akin to a microservice architecture. Indeed, the techniques herein are able to replicate any number of different partitions of a neural network for execution across a distributed set of devices, either once or repeatedly as needed. As would be appreciated, doing so also afford the neural network a degree of fault tolerance. More specifically, in the naïve replication case as described above, if one partition crashes, the entire replicated model will be unusable. However, in the case in which only one copy of a replicated partition crashes, the system will see the gradual performance degradation and potentially adapt to it by configuring a new replica on a different device, for instance.

Illustratively, the techniques described herein may be performed by hardware, software, and/or firmware, such as in accordance with the machine learning process 248, which may include computer executable instructions executed by the processor 220 (or independent processor of interfaces 210), to perform functions relating to the techniques described herein.

Specifically, according to various implementations, a controller determines performance of a partitioned neural network. The controller identifies, based on the performance, a particular partition of the partitioned neural network as a bottleneck. The controller configures a first device to execute a replica of the particular partition. The controller configures a multiplexer that provides an output of the particular partition or the replica of the particular partition as input to a downstream partition of the partitioned neural network.

Figure 5:
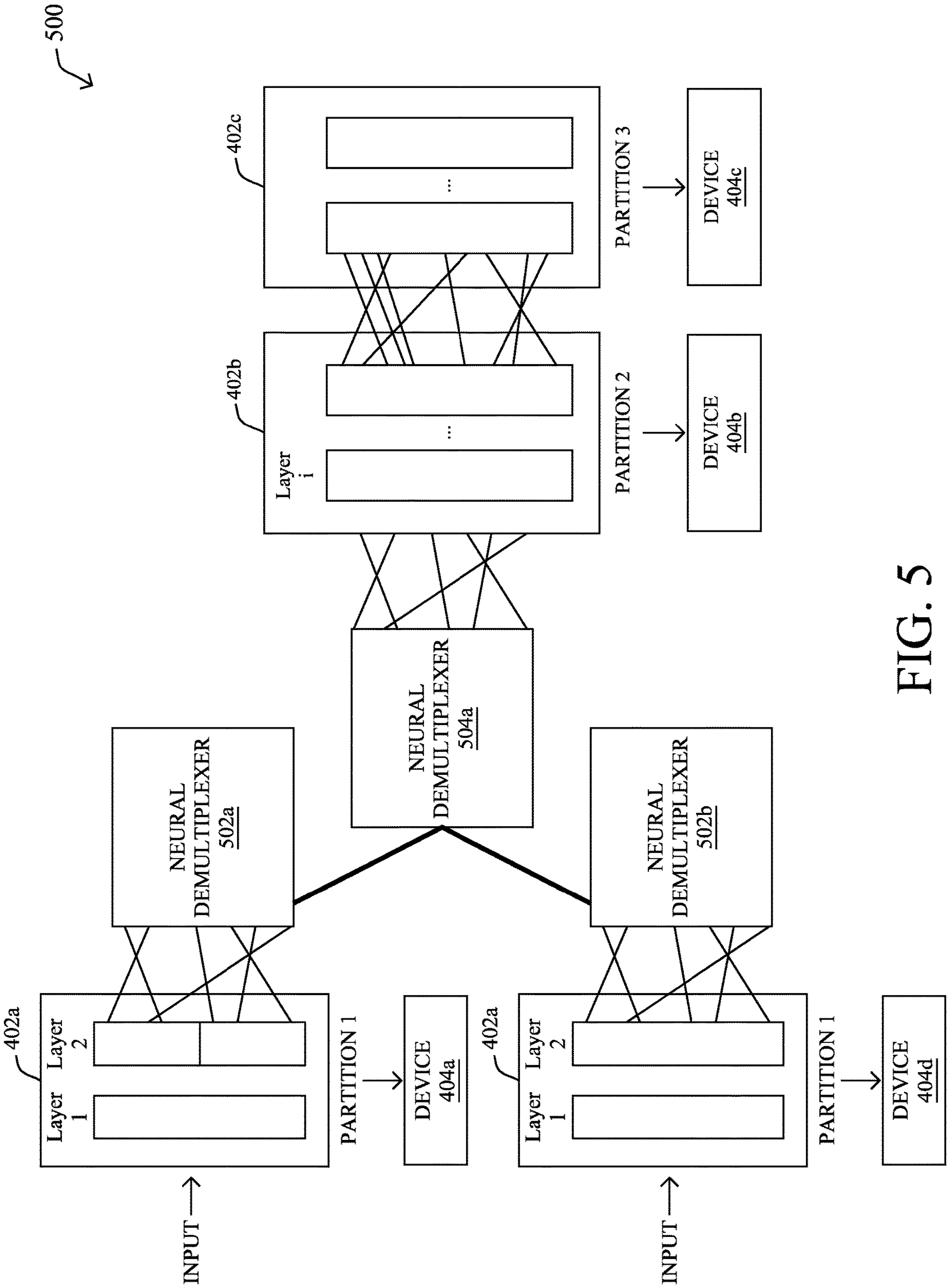
FIG. 5 illustrates an example of replicating a partition of a partitioned neural network.

Operationally, FIG. 5 illustrates an example 500 of replicating a partition of a partitioned neural network, in various implementations. As shown, again consider the case of partitioned neural network 400 that has been partitioned into partitions 402*a*-402*c*, which partition 402*a* being the most resource intensive.

In various implementations, a controller for partitioned neural network 400, which may be any of devices 404*a*-404*d* shown, or another device in communication therewith, may receive performance data regarding the execution of partitioned neural network 400. For instance, such information may include, but is not limited to, latency/delay information, network path information between the devices 404*a*-404*d*, queue information, or the like. In addition, in some cases, the controller may also receive information regarding the used and/or available resources for each of devices 404*a*-404*d*.

Using the captured performance information, the controller may then flag one of the partitions as being a bottleneck. For instance, again assume that partition 402*a* is resource intensive and its execution by device 404*a* is slowing down the inference by the full partitioned neural network 400.

In various implementations, rather than simply replicating the entirety of partitioned neural network 400 for execution by additional devices, the controller may instead opt to replicate only the bottlenecked partition, partition 402*a*. Thus, as shown, the controller may configure device 404*d* to execute a replica of partition 402. This means that there are now two options available with respect to the execution of partition 402*a* for any given set of input data (e.g., sensor data, other telemetry, etc.): 1.) let the original partition 402*a* on device 404*a* process it or 2.) let device 404*d* instead execute its replica of partition 402*a*.

In order to connect both partition 402*a* on device 404*a* and its replica partition 402*a* on device 404*d* to the downstream partition, partition 402*b* on device 404*b*, the controller may also configure device 404*b* to execute a neural multiplexer 504*a*. The role of neural multiplexer 504*a* is to take as input the output of either copy of partition 402*a* from either device 404*a* or device 404*d*, depending on which one was selected by the controller to process a given set of input data.

In addition, in some instances, the controller may also configure device 404*a* to execute a first neural demultiplexer 502*a* and device 404*d* to execute a second neural demultiplexer 502*b*. Each of demultiplexers 502-502*b* may be configured to take as input the output of its associated copy of partition 402*a* and provide it via the computer network to neural multiplexer 504*a* for input to the downstream partition 402*b*. From there, the chain of partitions 402*a*-402*c* will proceed as normal, with device 404*b* sending the output of partition 402*b* onward to device 404*c* for input to partition 402*c*.

Figure 6:
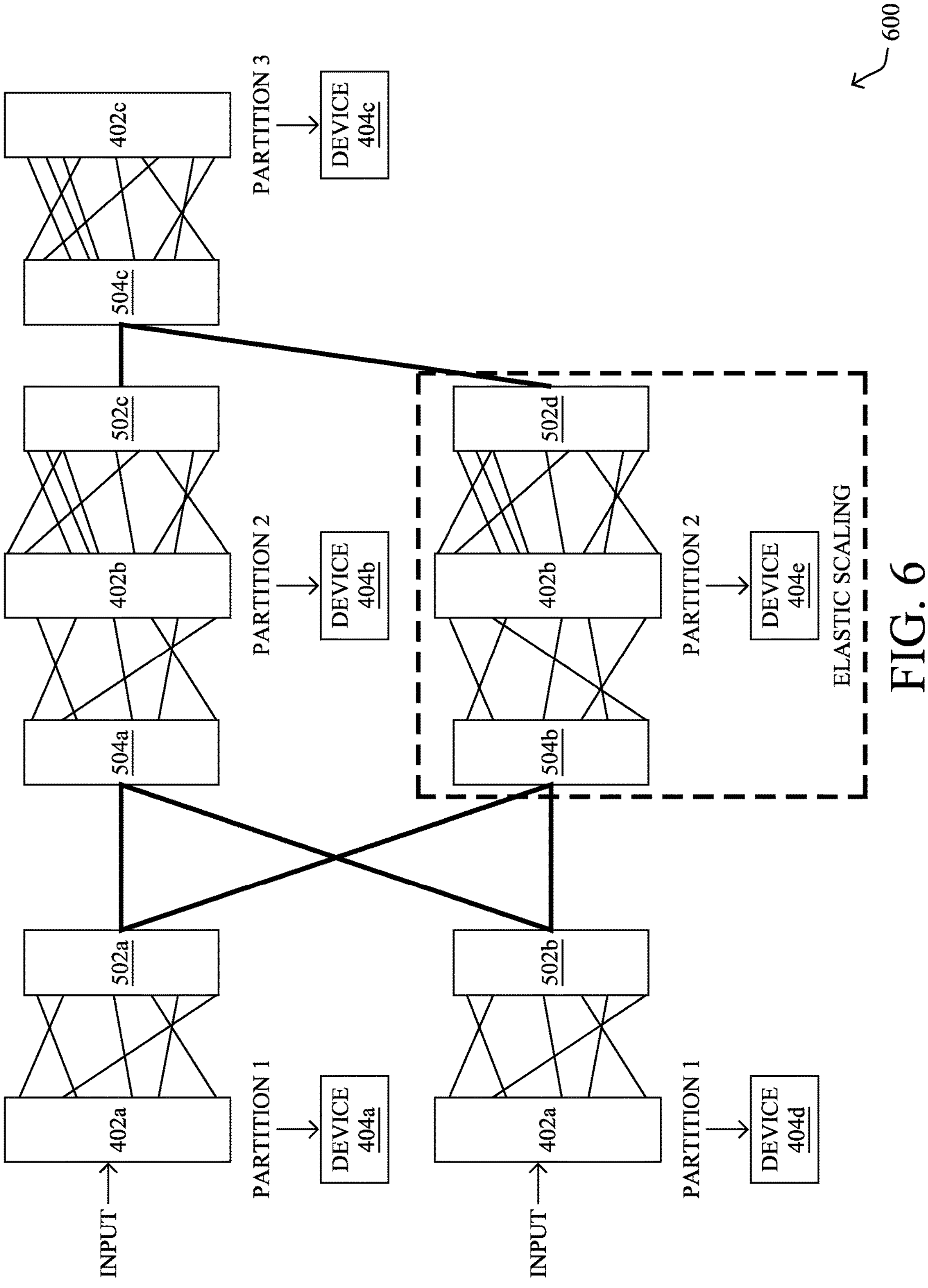
FIG. 6 illustrates an example of elastically scaling a partitioned neural network.

FIG. 6 illustrates an example 600 of elastically scaling a partitioned neural network, in various implementations. Continuing the example of FIG. 5, consider now the case in which partition 402*b* now becomes its own bottleneck in the layout in FIG. 5. In such a case, the controller may elastically scale partitioned neural network 400 by now configuring device 404*e* to execute a replica of partition 402*b*. Also similar to the case in FIG. 5, the controller may further configure device 404*e* to execute its own neural multiplexer 504*b*, similar to that of device 404*b*, and connect first neural demultiplexer 502*a* and second neural demultiplexer 502*b* to both neural multiplexer 504*a* and to neural multiplexer 504*b*.

In a similar manner, the controller may also configure a neural demultiplexer 502*c* for execution by device 404*b*, a neural demultiplexer 502*d* for execution by device 404*e*, and a neural multiplexer 504*c* for execution by device 404*c*. Thus, neural demultiplexer 502*c* and neural demultiplexer 502*d* may provide the outputs of the copies of partition 402*b* to neural multiplexer 504*c* for input to partition 402*c* via the computer network.

In some instances, any downstream device may provide performance feedback data to its upstream devices, such as its delay metrics, queuing information, etc. Doing so allows any upstream demultiplexer 502 to select which of its downstream neural multiplexers 504 to send its output data. For instance, assume that the latency or queueing information of device 404*b* is currently worse than that of device 404*e*. In such a case, first neural demultiplexer 502*a* and second neural demultiplexer 502*b* may leverage this information to opt to sends the outputs of the copies of partition 402*a* via the computer network to device 404*e* for input to its copy of partition 402*b*.

Figure 4B:
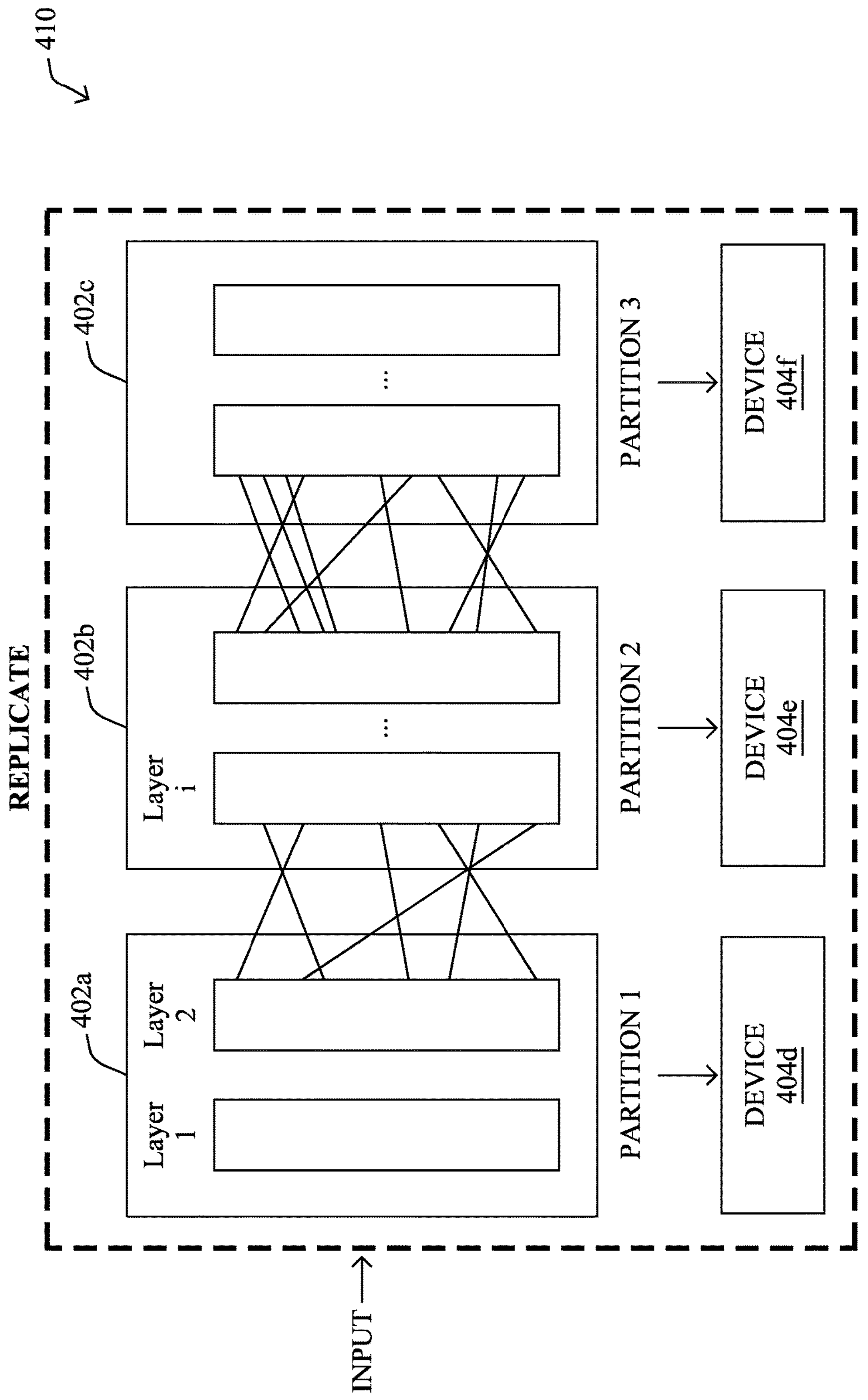

Even in the scenario shown in FIG. 6, the system will still consume fewer computational resources than in the case of FIGS. 4A-4B, as a replica of partition 402*c* is still not needed.

Of course, the controller may also scale down the resource usage by partitioned neural network 400 over time, depending on its performance. For instance, assume that computational resources at device 404*b* become more available over time. In such a case, the controller may then opt to disable the replica of partition 402*b* at device 404*e*, thereby freeing up device 404*e* for other potential tasks.

Figure 7:
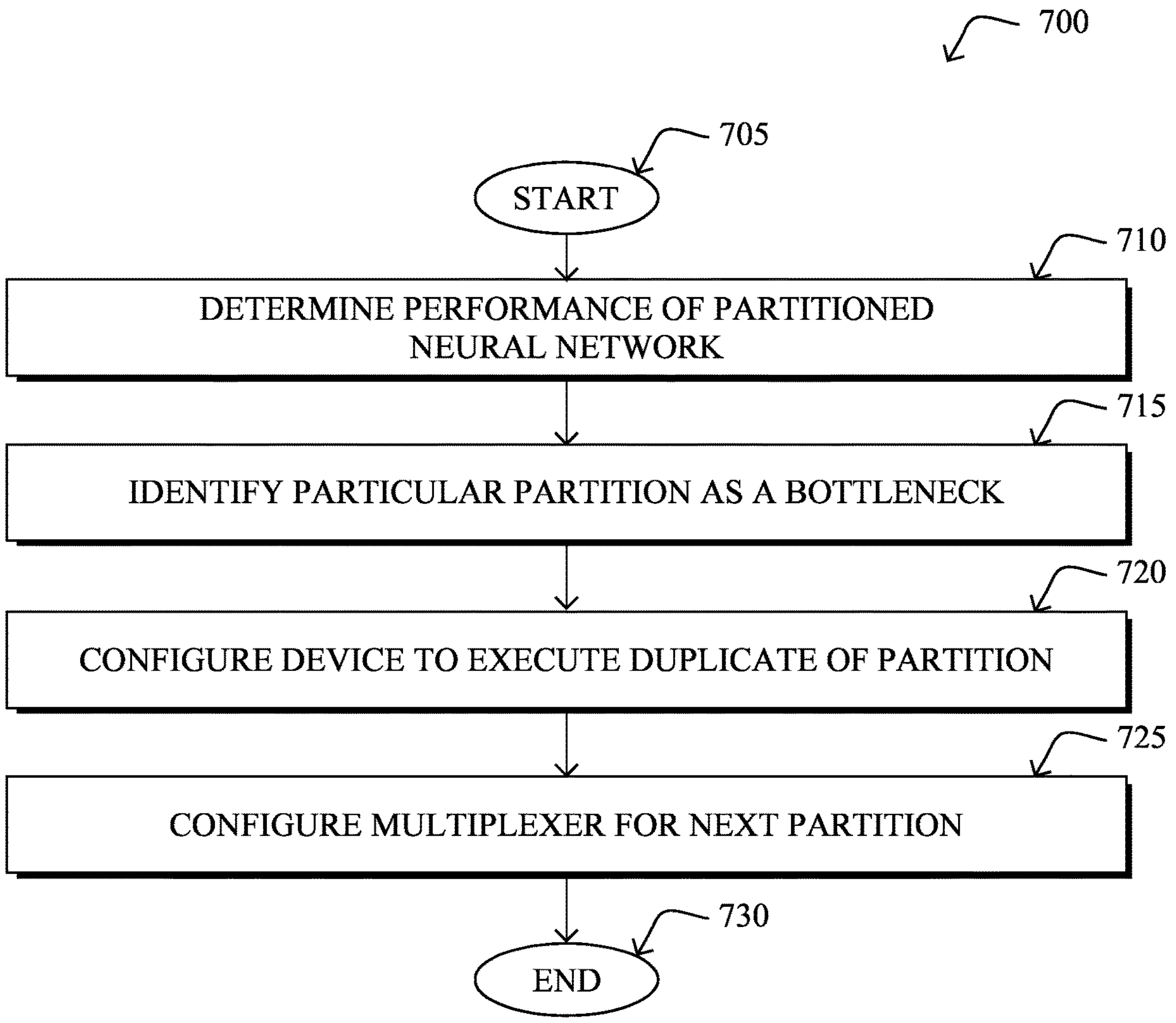
FIG. 7 illustrates an example simplified procedure for the efficient scaling of partitioned neural network inference.

FIG. 7 illustrates an example simplified procedure 700 (e.g., a method) for the efficient scaling of partitioned neural network inference, in accordance with one or more implementations described herein. For example, a non-generic, specifically configured controller (e.g., device 200) may perform procedure 700 by executing stored instructions (e.g., machine learning process 248). The procedure 700 may start at step 705, and continues to step 710, where, as described in greater detail above, the controller may determine performance of a partitioned neural network. In some implementations, the partitioned neural network comprises at least one partition that is not replicated. In various implementations, the partitioned neural network analyzes sensor data captured by one or more sensors (e.g., cameras, microphones, motion sensors, pressure sensors, radar, lidar, etc.). In one implementation, the partitioned neural network is executed by a plurality of distributed devices across a computer network.

At step 715, as detailed above, the controller may identify, based on the performance, a particular partition of the partitioned neural network as a bottleneck.

At step 720, the controller may configure a first device to execute a replica of the particular partition, as described in greater detail above. In some implementations, the particular partition is executed by a second device. In further implementations, the controller may also disable the replica of the particular partition based on a determination that the particular partition is no longer a bottleneck.

At step 725, as detailed above, the controller may configure a multiplexer that provides an output of the particular partition or the replica of the particular partition as input to a downstream partition of the partitioned neural network. In some implementations, the downstream partition is executed by a third device and receives the output of the particular partition or the replica of the particular partition via a computer network. In various implementations, the controller may also configure a first demultiplexer that takes, as input, an output of the particular partition and provides it to the multiplexer and configure a second demultiplexer that takes, as input, an output of the replica of the particular partition and provides it to the multiplexer. In one implementation, the first demultiplexer and the second demultiplexer select the multiplexer based on delay or queuing information provided by the multiplexer. In some implementations, the controller may also configure an additional device to execute a replica of the downstream partition and its multiplexer and configure the first demultiplexer and the second demultiplexer to select between the multiplexer of the downstream partition and the multiplexer of the replica of the downstream partition.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for the efficient scaling of partitioned neural network inference, it is to be understood that various other adaptations and modifications may be made within the spirit and scope of the implementations herein. For example, while certain implementations are described herein with respect to specific use cases for the techniques herein, the techniques can be extended without undue experimentation to other use cases, as well.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof, that cause a device to perform the techniques herein. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method comprising:
- determining, by a controller, performance of a partitioned neural network;
- identifying, by the controller and based on the performance, a particular partition of the partitioned neural network as a bottleneck;
- configuring, by the controller, a first device to execute a replica of the particular partition; and
- configuring, by the controller, a multiplexer that provides an output of the particular partition or the replica of the particular partition as input to a downstream partition of the partitioned neural network.

2. The method as in claim 1, wherein the particular partition is executed by a second device.

3. The method as in claim 2, wherein the downstream partition is executed by a third device and receives the output of the particular partition or the replica of the particular partition via a computer network.

4. The method as in claim 1, wherein the partitioned neural network comprises at least one partition that is not replicated.

5. The method as in claim 1, further comprising:
- configuring, by the controller, a first demultiplexer that takes as input an output of the particular partition and provides it to the multiplexer; and
- configuring, by the controller, a second demultiplexer that takes as input an output of the replica of the particular partition and provides it to the multiplexer.

6. The method as in claim 5, wherein the first demultiplexer and the second demultiplexer select the multiplexer based on delay or queuing information provided by the multiplexer.

7. The method as in claim 5, further comprising:
- configuring, by the controller, an additional device to execute a replica of the downstream partition and its multiplexer; and
- configuring, by the controller, the first demultiplexer and the second demultiplexer to select between the multiplexer of the downstream partition and the multiplexer of the replica of the downstream partition.

8. The method as in claim 1, wherein the partitioned neural network analyzes sensor data captured by one or more sensors.

9. The method as in claim 1, wherein the partitioned neural network is executed by a plurality of distributed devices across a computer network.

10. The method as in claim 1, further comprising:
- disabling, by the controller, the replica of the particular partition based on a determination that the particular partition is no longer a bottleneck.

11. An apparatus, comprising:
- a network interface to communicate with a computer network;
- a processor coupled to the network interface and configured to execute one or more processes; and
- a memory configured to store a process that is executed by the processor, the process when executed configured to:
  - determine performance of a partitioned neural network;
  - identify, based on the performance, a particular partition of the partitioned neural network as a bottleneck;
  - configure a first device to execute a replica of the particular partition; and
  - configure a multiplexer that provides an output of the particular partition or the replica of the particular partition as input to a downstream partition of the partitioned neural network.

12. The apparatus as in claim 11, wherein the particular partition is executed by a second device.

13. The apparatus as in claim 12, wherein the downstream partition is executed by a third device and receives the output of the particular partition or the replica of the particular partition via a computer network.

14. The apparatus as in claim 11, wherein the partitioned neural network comprises at least one partition that is not replicated.

15. The apparatus as in claim 11, wherein the process when executed is further configured to:
- configure a first demultiplexer that takes as input an output of the particular partition and provides it to the multiplexer; and
- configure a second demultiplexer that takes as input an output of the replica of the particular partition and provides it to the multiplexer.

16. The apparatus as in claim 15, wherein the first demultiplexer and the second demultiplexer select the multiplexer based on delay or queuing information provided by the multiplexer.

17. The apparatus as in claim 15, wherein the process when executed is further configured to:
- configure an additional device to execute a replica of the downstream partition and its multiplexer; and
- configure the first demultiplexer and the second demultiplexer to select between the multiplexer of the downstream partition and the multiplexer of the replica of the downstream partition.

18. The apparatus as in claim 11, wherein the partitioned neural network analyzes sensor data captured by one or more sensors.

19. The apparatus as in claim 11, wherein the partitioned neural network is executed by a plurality of distributed devices across a computer network.

20. A tangible, non-transitory, computer-readable medium storing program instructions that cause a controller to execute a process comprising:

determining, by a controller, performance of a partitioned neural network;

identifying, by the controller and based on the performance, a particular partition of the partitioned neural network as a bottleneck;

configuring, by the controller, a first device to execute a replica of the particular partition; and configuring, by the controller, a multiplexer that provides an output of the particular partition or the replica of the particular partition as input to a downstream partition of the partitioned neural network.

* * * * *